United States Patent [19]

Suppa

[11] 4,279,025

[45] Jul. 14, 1981

[54] RELEASABLE AIRBORNE BUOY

[75] Inventor: Vito Suppa, Paris, France

[73] Assignee: Thomson-CSF, Paris, France

[21] Appl. No.: 57,422

[22] Filed: Jul. 13, 1979

[30] Foreign Application Priority Data

Jul. 18, 1978 [FR] France ................. 78 21276

[51] Int. Cl.³ .................. B63B 21/52; H04B 1/59
[52] U.S. Cl. .......................... 367/3; 9/8 R; 244/138 R
[58] Field of Search ............... 367/3, 4; 9/8 R; 244/138 R

[56] References Cited

U.S. PATENT DOCUMENTS

| 3,234,503 | 2/1966 | Wojciechowski et al. | 367/3 |
| 3,889,224 | 6/1975 | Reed et al. | 367/3 |

Primary Examiner—Richard A. Farley
Attorney, Agent, or Firm—Cushman, Darby & Cushman

[57] ABSTRACT

A buoy capable of being dropped onto water from an aircraft, comprising a balloon which inflates during the descent through a forced intake of air through adjustable openings at the base of the balloon. Inside the balloon there is a flexible membrane allowing the air to enter through holes, the balloon remaining inflated to the maximum pressure encountered during the descent. Pockets with openings are traversed by the air and prevent the balloon from rotating during its descent.

11 Claims, 2 Drawing Figures

U.S. Patent  Jul. 14, 1981  4,279,025
FIG_1
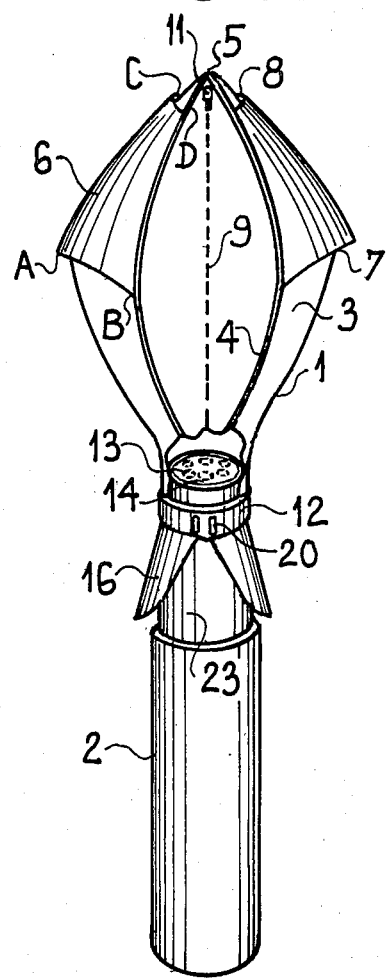
FIG_2
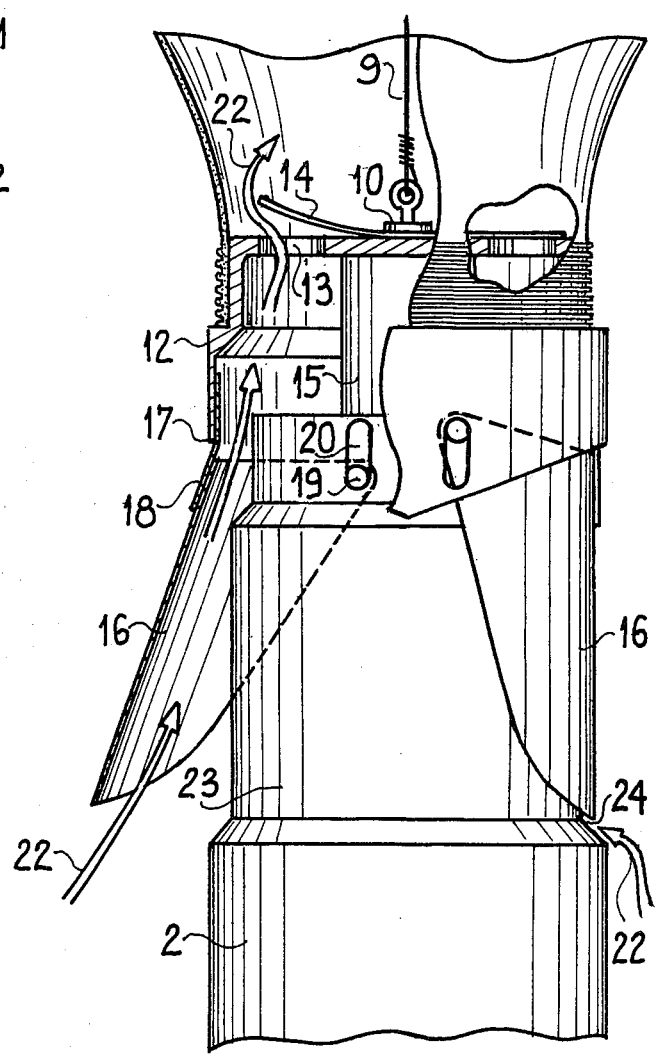

RELEASABLE AIRBORNE BUOY

This invention relates to buoys released from an aircraft and, more particularly, to acoustic radiobuoys which, after landing on water, are intended to transmit radioelectrically various underwater parameters and information detected by acoustic receivers. Radiobuoys of this type generally comprise a float equipped with an antenna ans a hydrophone which, attached to the float, descends to a certain depth for detecting the acoustic noise. The electrical signals of the hydrophone are treated and applied to the radioelectric antenna.

The descent of the buoy after its release has to be braked and aerodynamically stabilized to ensure that, after the impact of landing on water, buoyancy is guaranteed and the radioelectric and acoustic systems are positioned to function correctly.

According to the prior art, it is known that a balloon may be used as the float. This balloon inflates during the descent and, after landing on the water, the air is trapped in the balloon and ensures buoyancy when the balloon lands on the water.

However, this system is attended by the disadvantage of slow inflation which prevents release at low altitudes. In addition, the balloon is in danger of snaking during the descent, resulting in the loss of the buoy.

It is also known that the descent of the balloon can be decelerated by a parachute which involves the disadvantage of using rigging lines or lashings.

Accordingly, the present invention relates to a buoy releasable from an aircraft which does not have any of these disadvantages. According to one aspect of the invention, the buoy comprises an inflatable balloon attached to a container, and, during the descent, the balloon is inflated by a forced intake of air at the base of the balloon and, inside the balloon, there is a membrane of a flexible material capable of blocking the air inlet or outlet openings of the balloon, the pressure of the balloon thus being equal to the maximum dynamic pressure of the air during the descent.

According to another aspect of the invention, the upper part of the balloon is provided with pockets through which the air flows during the descent. These currents of air produce a pressure which stabilises the balloon in rotation during its descent.

Other features and advantages of the invention will become apparent from the following description:

FIG. 1 is a general view of the releaseable buoy according to the invention;

FIG. 2 is a detailed view of the system for inflating the balloon by the forced intake of air.

FIG. 1 shows one example of embodiment of the balloon 1 with the container 2 which it supports and which contains the hydrophones with the associated electronics. After its descent, the balloon 1 acts as a float and contains a radioelectric antenna 9 which has to be kept above the water line. The balloon has an axis of symmetry and comprises a certain number of surfaces 3 of a plastic fabric which are joined together by seams or welds, such as 4. The seams or welds are situated in planes of symmetry of the balloon passing through the crown 5. Pockets, such as 6, are fixed to the outer surface and in the upper part of the balloon. These pockets have a lower opening 7 and an upper opening 8 for the passage of the air which applies a pressure to the surface 3 below the pocket.

These pockets may be made of the same material as the balloon itself and, in the embodiment illustrated, the pockets are also fixed to the seams or welds 4. Only one of the surfaces, such as 3, out of two is provided with a pocket. For reasons of overall stability, the number of pockets is preferably odd. In the embodiment illustrated, there are six surfaces such as 3 and three pockets such as 6. If the tips of a pocket are called ABCD and the developed lengths AB and CD of this pocket are called $L_7$ and $L_8$ and if, in addition, the developed lengths AB and CD on the surfaces 3 are called $l_7$ and $l_8$, the values of $L_7$, $L_8$, $l_7$ and $l_8$ for this embodiment are such that: $L_8/l_8 = L_7/l_7 = 1.05$.

If H is the length of a seam or weld, such as 4, and the height of a pocket of developed length $h = AC = BD$, the value of $h/H$ is generally between 0.25 and 0.44.

The radioelectric antenna 9 is stretched between the lower and upper fastening points 10 and 5 by means of an elastic element 11.

FIG. 2 shows how the balloon is fixed to the container 2 by the connecting element 17. This figure shows holes 13 and membrane 14 of an elastomeric material which is fixed at its centre 10 and which is capable of blocking the holes 13 from the inside of the balloon. A compartment 15 containing the radioelectric transmitter is fixed to the part 12. The compartment 15 may also accommodate various mechanisms depending on the functions to be performed by the container 2.

Curved mechanical elements 16 in the form of scoops, which for this reason will be referred to hereinafter as scoops, provide for the forced intake or air into the balloon. They are articulated by the thin plate 18 about the hinge 17 which is formed by a thin strip of metal having a high elastic limit.

At their upper end, the scoops 16 carry a lug 19 which slides in slots, such as 20, of the part 12 which are also visible in FIG. 1.

The path followed by the air during inflation is indicated by the arrows 22 in the figure. The upper part or "neck" 23 of the container acts as a support for the scoops when they are in their lowered position (on the right in FIG. 2).

The assembly shown in FIG. 1 is intended to be released from an aircraft (aeroplane or helicopter) above the water on which it lands at a sufficiently moderated speed, of the order of 50 knots (90 km/hour), to withstand the impact. The balloon then acts as a float for the container 2 which, by virtue of its antenna 9, retransmits various underwater information and parameters.

The releasable buoy according to the invention operates as follows:

Where the buoy is released from an aeroplane for example, the air rushes into the remaining space 24 between the scoops 16, which are kept in their rest position along the container 2 by the springs 18, and the neck 23. The scoops 16 are then raised, turning about their hinge 17, and offer an increasingly larger space to the passage of the air. The scoops stop after a rotation of approximatively 20° limited by the arrival of the lugs 19 as stops at the bottom of the slots 20.

The air follows the path indicated by the arrows 22 and passes through the holes 13, lifting the membrane 14 to enter the balloon 1 folded in a container (not shown) which rises on inflation and is ejected. The function performed by the membrane 14 is as follows: the inflation air has a dynamic pressure of the order of $\frac{1}{2}\rho V^2$, $\rho$ representing the density of the air and V the speed of descent of the balloon, with considerable fluctuations because air flow along the container 2 is turbulent. Each time this dynamic pressure exceeds the static pressure prevailing in the balloon, the membrane rises to allow the air to pass towards the balloon and then drops back again, acting as a valve which enables the balloon to be inflated to the maximum of the dynamic pressure encountered throughout the descent. This aspect is important because it is known that the rigidity of inflatable structures varies very considerably with their inflation pressure. The fact that the balloon is inflated to the maximum pressure encountered enables the flow of air on the outside of the balloon to be better regularized, as will be seen hereinafter.

By using forced air channelled by the rigid scoops, the inflation process according to the invention is comparable with genuine filling by means of a cylinder of compressed air and has the same operational reliability because it avoids cases where the balloon does not unfold.

Once the balloon 1 has been inflated, the air-braked descent phase begins. This air-bracking effect is obtained solely by the aerodynamic drag of the balloon 1 of which the shape and volume are respectively calculated on the one hand to obtain this drag and to ensure landing on the water at a speed of the order of 50 knots and, on the other hand, to ensure that the assembly floats after landing on the water.

However, experience has shown that the flow of air over the surfaces 3 of the balloon 1 is not a laminar flow, but instead a highly disturbed flow of the turbulent type due to the appearance of a vortex along the container 2 of the buoy. The result of this flow is that the balloon spins like a top about the axis of descent, the surfaces 3 shiver and shake and inflation is incomplete.

According to one of the aspects of the invention, these disadvantages are obviated by pockets, such as 6 (FIG. 1), which channel the air between their point of entry 7 and their exit 8.

The length $L_7$ of the entrance 7 is greater than the length $L_8$ of the exit 8. The air is thus forced against the surfaces 3 of the balloon. The pockets barely affect the top speed of descent of the balloon and, hence, do not act as an air-brake or parachute. By contrast, they stabilize the balloon during its descent and prevent spinning, shaking of the surfaces 3 and beating and provide for complete inflation.

In one embodiment, the balloon comprises six surfaces, such as 3, made of an impermeable material which is bonded and sewn or ultrasonically welded, the material being preferably a plastic cloth.

The pocket 6 are three in number. Generally, if $2n$ represents the number of individual surfaces 3, experience has shown that a number n of pockets 6 is sufficient for effective stabilization. In another embodiment, the balloon 1 is in one piece, i.e. seamless, and effective stabilization is again obtained by means of pockets covering its upper part over a development representing between one third and one half of that of the balloon, these pockets being three in number.

It has been seen that, in one embodiment, a value of 1.05 is taken for the ratios $L_7/l_7$ and $L_8/l_8$ where $l_7$ and $l_8$ are the developed lengths on the surfaces 3 corresponding to the openings 7 and 8.

In fact this ratio has to be between 1.1 and 1 and, even with this latter value, the air is able to pass through, the surface 3 curving inwards.

In conclusion, it is possible by virtue of the invention easily to produce acoustic radioelectric buoys with a well-controlled descent.

I claim:

1. A buoy capable of being dropped onto water from an aircraft, comprising an inflatable balloon attached to a container, wherein the balloon is inflated during its descent by a forced intake of air at the base of the balloon and said balloon contains a membrane made of a flexible material which is capable of blocking the air inlet or outlet openings of the balloon, the pressure of the balloon thus being equal to the maximum dynamic pressure of the air during the descent, said ballon having adjustable openings in the form of scoops and a sealed passage connecting the upper part of the scoops to the lower part of the balloon and the forced intake of air taking place through the opening of these scoops.

2. A releasable buoy as claimed in claim 1, wherein the scoops are made of a rigid material.

3. A releasable buoy as claimed in claim 1, wherein said balloon comprises at least two pockets provided externally along the upper half of the balloon and comprising openings at their upper and lower ends, the effect of the air flowing through these pockets being to stabilise the balloon in rotation during its descent.

4. A releasable buoy as claimed in claim 3, wherein said pockets cover approximatively half the upper surface of the balloon.

5. A releasable buoy as claimed in claim 3, wherein said pockets are made of a flexible and impermeable material.

6. A releasable buoy as claimed in claim 3, wherein one of the walls of said pockets is formed by the surface of the balloon.

7. A releasable buoy as claimed in claim 3, wherein the ratio of the developed lengths of the openings of the pockets to the corresponding lengths on said balloon amounts to between 1 and 1.1.

8. A releasable buoy as claimed in claim 3, wherein the ratio of the developed length of the lower opening of said pockets to the developed length of the upper opening of said pockets amounts to between 2 and 6.

9. A releasable buoy as claimed in claim 4, wherein said pockets are made of the same material as said balloon.

10. A releasable buoy as claimed in claim 4, wherein the constituent material of said pockets are selected in such a way that said pockets may be thermally welded to said balloon.

11. A releasable buoy as claimed in claims 1 or 2, wherein said buoy is an acoustic radioelectric buoy and the radioelectric transmission antenna is mounted in said balloon and in that said container accomodates the radioelectric transmitter and the acoustic sounding systems.

* * * * *